Dec. 31, 1929. J. E. BOYNTON 1,741,813
APPARATUS FOR PRODUCING COMPOSITE ARTICLES
Original Filed March 25, 1925
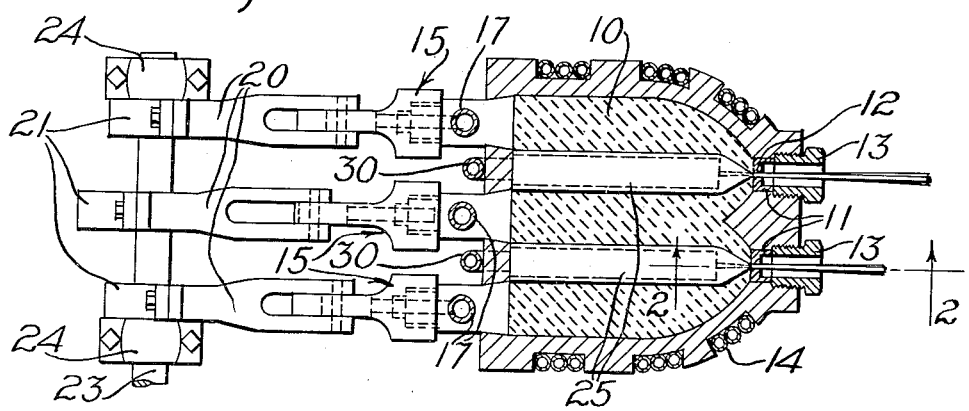
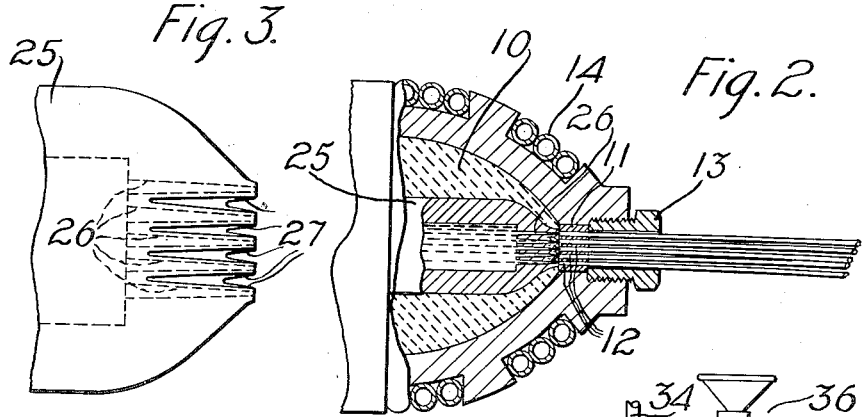
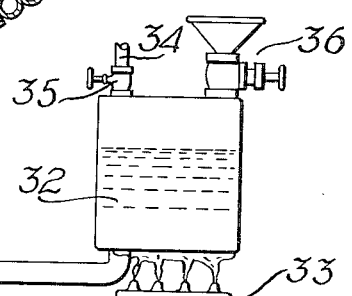
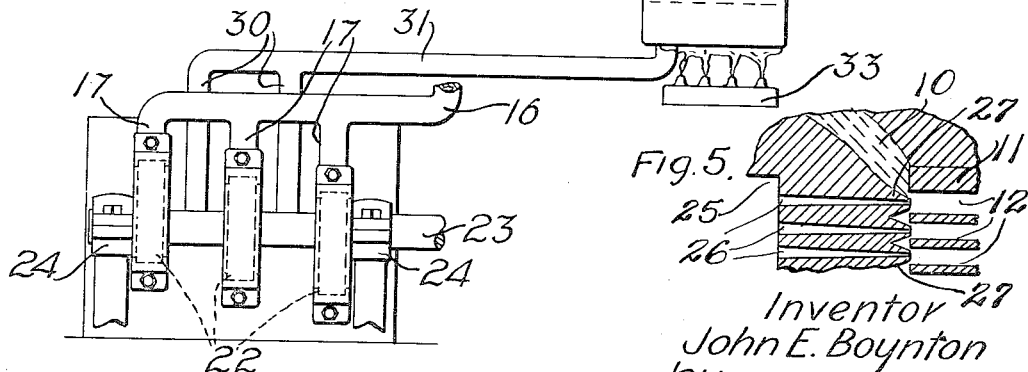
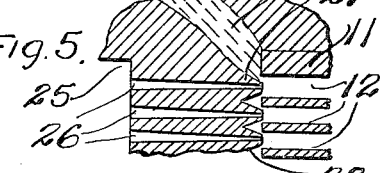
Inventor
John E. Boynton
by H. C. Pattison
Att'y.

Patented Dec. 31, 1929

1,741,813

UNITED STATES PATENT OFFICE

JOHN EDSON BOYNTON, OF OAK PARK, ILLINOIS, ASSIGNOR TO WESTERN ELECTRIC COMPANY, INCORPORATED, OF NEW YORK, N. Y., A CORPORATION OF NEW YORK

APPARATUS FOR PRODUCING COMPOSITE ARTICLES

Application filed March 25, 1925, Serial No. 18,133. Renewed August 13, 1929.

This invention relates to apparatus for producing composite articles, particularly by means of extrusion, and has for its main object the provision of an improved apparatus for continuously producing a composite article, particularly flux core solder.

In an improved mechanism embodying the invention, an extruding chamber is provided with a multi-apertured die which is secured in the extrusion orifice thereof. A plurality of pumps continuously supply molten solder under pressure to this chamber where the solder is transformed to a solid state and continuously extruded through the die due to such pressure. A second chamber projects into the solder chamber and has a plurality of discharge openings aligned with the die openings. The solder is extruded through the die in the form of a pipe, and the flux in liquid form is continuously forced into the hollow portion thereof where it is solidified as the resulting composite strand leaves the die opening.

Other objects and features of the invention will become apparent from a consideration of the following detailed description considered with the accompanying drawings, in which Fig. 1 is a plan view, partly in section, of an extruding machine embodying the features of the invention which machine is particularly adapted for use in the production of flux core solder;

Fig. 2 is a fragmentary section taken on the line 2—2 of Fig. 1;

Fig. 3 is an enlarged side elevation of a portion of Fig. 2;

Fig. 4 is an end elevation of the mechanism shown in Fig. 1, and

Fig. 5 is an enlarged fragmentary sectional view of the flux and solder discharge openings as shown in Fig. 2.

The mechanism shown in the accompanying drawings is particularly adapted to the production of flux core solder, and in the following description particular reference will be made to specific functions thereof. It will be apparent, however, that the features thereof may be employed in the production of other forms of composite articles. It is believed, as well, that the method will be understood from a description of the mechanism.

Referring now in detail to the accompanying drawings, an extruding chamber 10 is provided with an extrusion aperture in which is secured a die 11 having therein a plurality of apertures 12, the die 11 being positioned longitudinally by means of a member 13 and being held against rotation by any suitable means (not shown). Suitable pipes 14 are provided for controlling the temperature of the chamber 10, it being possible by means thereof to circulate suitable heating or cooling matter around the chamber. A plurality of pump members 15 which preferably embody the features described in Patent No. 1,720,759, issued July 16, 1929 to John Edson Boynton, are adapted to receive molten solder from a suitable source of supply through a pipe 16 (Fig. 4) and discharge it directly into the chamber 10, a plurality of branches 17 of the pipe 16 feeding the molten solder by gravity to the individual pumps. The pumps may be operated sequentially by means of eccentric rods 20 which are secured by means of straps 21 to eccentrics 22 which rotate with a shaft 23, rotatably journaled in a plurality of bearings 24 and connected in any suitable manner to a source of power (not shown).

A plurality of chambers 25 for containing molten flux such as rosin, are projected into the solder chamber 10 and are held in alignment therewith in any suitable manner, a plurality of discharge openings 26 through a plurality of projections 27 in each of said flux chambers 25 being in alignment with the apertures 12 in the dies 11. In this connection it is to be understood that the tips of the projections 27 are in contiguous alignment with the apertures 12, as shown in Figs. 2 and 5 so that the molten solder may be extruded from the chamber 11 in the form of a tube or pipe structure. The temperature of the medium circulated through the pipes 14 may be conveniently controlled to effect the solidification of the solder at the proper point or zone within the chamber 10, namely, at a point approximating the point of extrusion of the solder. The flux chambers 25 are supplied with molten flux through feed pipes 30 which are branched from a main feed pipe 31 leading from a flux container 32. The flux within the chamber 32 is kept in a molten condition by suitable means such as a gas burner 33; and air under pressure introduced through a pipe 34 and controlled by a valve 35 is employed to regulate the pressure with which the molten flux is forced into the flux chambers 25. A suitable arrangement such as shown at 36 is employed to permit the introduction of molten flux into the container 32. From the foregoing description it is apparent that by properly timing the pump members 15 an even and constant flow of fused matter into the extrusion chamber and a consequent continuity of extrusion of solidified matter can be readily obtained.

What is claimed is:

1. In an extruding machine, a chamber containing matter to be extruded, an extruding die associated with the chamber, a substantially hollow receptacle containing matter in a liquid state and having a discharge opening extending into the opening in said die, and means cooperating with the interior wall of said chamber and the exterior wall of the receptacle for continuously forcing the extrudable matter through said die to form a pipe to receive the matter contained in said hollow receptacle.

2. In an extruding machine, a chamber containing matter to be extruded, an extruding die associated with the chamber, a substantially hollow receptacle having a plurality of discharge openings extending into corresponding openings in the die and having grooves in a wall thereof to facilitate movement of the extrudable matter, and means cooperating with said chamber and hollow receptacle for continuously forcing the extrudable matter through said die to form a pipe to receive said liquid matter continuously forced therein.

3. In an extruding machine, a chamber containing matter to be extruded, an extruding die associated with the chamber, a plurality of subtsantially hollow receptacles containing matter in a liquid state and having a discharge opening extending in the opening in said die positioned in said chamber, and means coaxial of said hollow members and cooperating with said members and said chamber for continuously forcing the extrudable matter through the die to form a pipe to receive the liquid matter forced continuously thereto.

4. In an extruding machine, a chamber containing matter to be extruded, an extruding die associated with the chamber, a plurality of substantially hollow members positioned within said chamber containing matter in a liquid state and having openings extending into openings in said die and forming channels, a plunger individual to each of said channels, and means for reciprocating said plungers to effect continuous extrusion of the extrudable matter through said die to form a pipe to receive the liquid matter forced therein.

In witness whereof, I hereunto subscribe my name this 6th day of March, A. D. 1925.

JOHN EDSON BOYNTON.